United States Patent [19]

Benoit

[11] Patent Number: 5,685,048
[45] Date of Patent: Nov. 11, 1997

[54] MERCHANDISE PAIRING TIE

[76] Inventor: James C. Benoit, 73 Bradford St., Needham, Mass. 02192

[21] Appl. No.: 631,737

[22] Filed: Apr. 10, 1996

[51] Int. Cl.$^6$ ............................ B65D 63/00; A43C 11/00
[52] U.S. Cl. ................ 24/16 PB; 24/17 AP; 24/30.5 P; 24/712.2; 36/1
[58] Field of Search ............................ 24/16 PB, 17 B, 24/17 AP, 30.5 P, 306, 712.1, 712.2, 715, 713.6; 36/50.1, 1

[56]  References Cited

U.S. PATENT DOCUMENTS

| | | | |
|---|---|---|---|
| 3,712,655 | 1/1973 | Fuehrer | 24/16 PB |
| 3,766,608 | 10/1973 | Fay. | |
| 3,816,879 | 6/1974 | Merser et al. | 24/16 PB |
| 4,001,898 | 1/1977 | Caveney | 24/16 PB |
| 4,003,106 | 1/1977 | Schumacher et al. | |
| 4,240,183 | 12/1980 | Sumimoto et al. | 24/16 PB |
| 4,347,648 | 9/1982 | Dekkers. | |
| 4,680,836 | 7/1987 | Wisecup | 24/16 PB |
| 4,688,302 | 8/1987 | Caveney et al.. | |
| 4,728,064 | 3/1988 | Caveney. | |
| 4,754,529 | 7/1988 | Paradis. | |
| 4,951,362 | 8/1990 | Denemark et al.. | |
| 5,135,188 | 8/1992 | Anderson et al.. | |
| 5,154,376 | 10/1992 | Baum et al.. | |

FOREIGN PATENT DOCUMENTS 2058194  8/1980  United Kingdom.

OTHER PUBLICATIONS

Brochure, Catamount Manufacturing Incorporated, Restricted Bundle Cable Tie, p. 7.

Primary Examiner—Victor N. Sakran
Attorney, Agent, or Firm—Kriegsman & Kriegsman

[57]  ABSTRACT

A tie for use in pairing together two objects. The tie comprises a head having an elongated channel extending therethrough, a locking tang within the head, and a strap extending from the head. The strap is approximately 30 cm in length and is formed in a ladder structure having a plurality of rungs. The rungs of the strap are sequentially engaged by the locking tang when the strap is inserted into and through the elongated channel to form a closed loop. As the strap is further inserted through the elongated channel, the size of the closed loop is decreased. The tie further includes a projection formed on a rung of the strap and located approximately 26 cm from the head. The projection protrudes upward from the rung approximately 1 mm and serves as a stop to limit the minimum size of the closed loop which can be formed when the strap is inserted into the head.

9 Claims, 3 Drawing Sheets

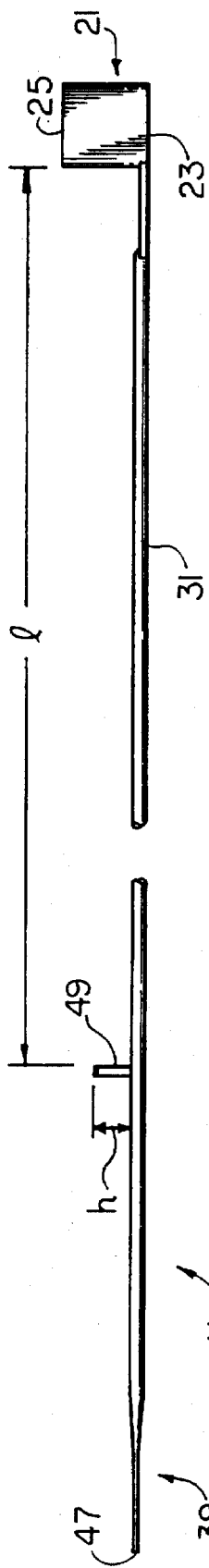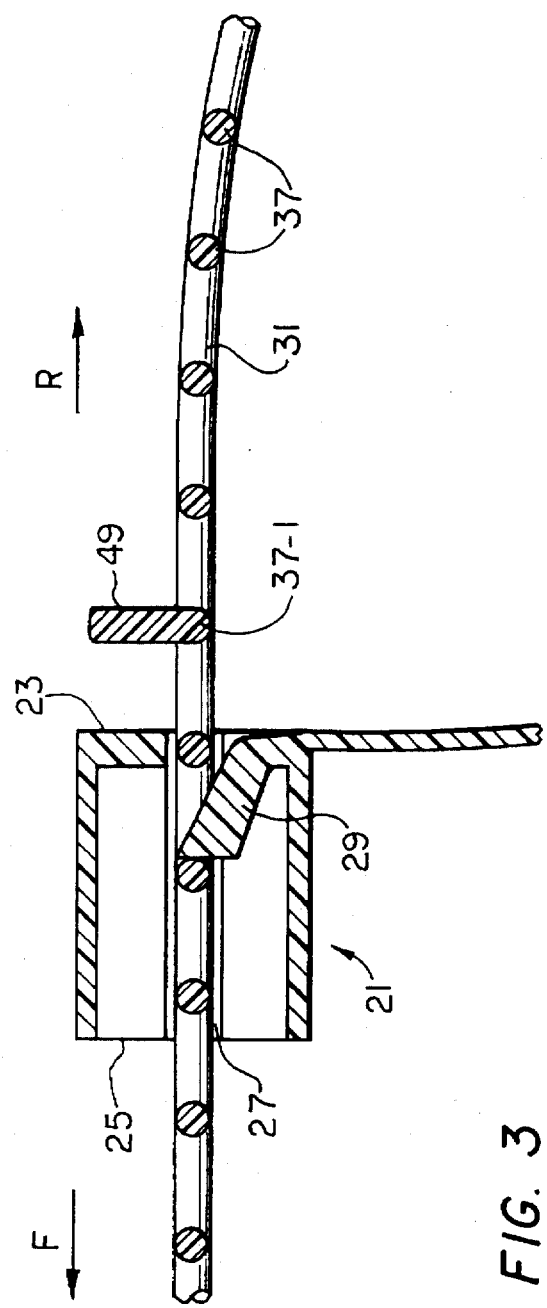
FIG. 2
FIG. 3

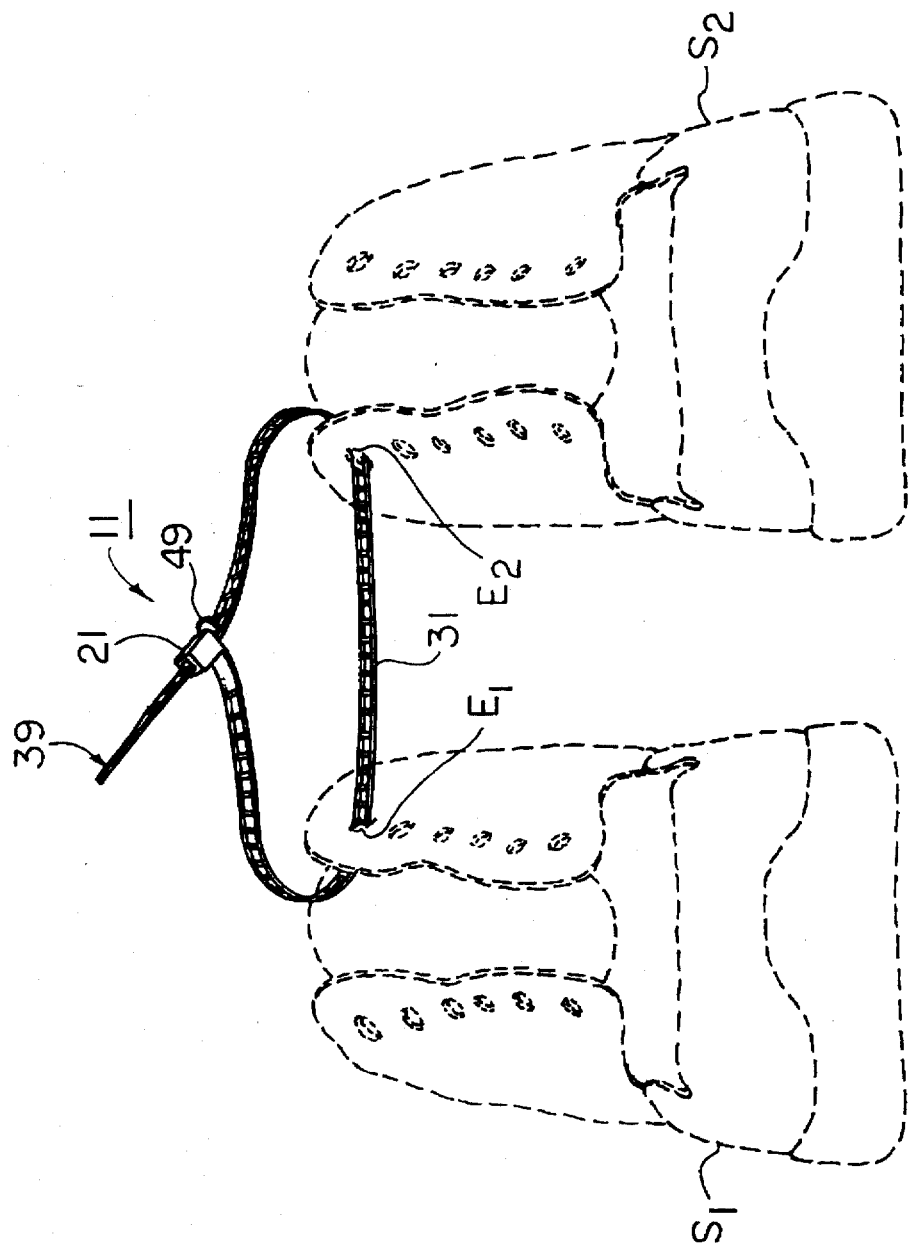

MERCHANDISE PAIRING TIE

BACKGROUND OF THE INVENTION

The present invention relates to a tie for pairing together two objects such as shoes or sneakers or gloves.

Ties are widely used for the bundling of objects such as a group of wires. One known tie comprises a serrated strap that is fitted to an apertured head containing an internal pawl or locking tang that engages the serrations of the strap. Another known tie is in the form of an apertured strap fitted to a buckle-like head, with a tongue that enters the apertures of the strap.

In U.S. Pat. No. 3,766,608 to Fay, which is incorporated herein by reference, there is disclosed a tie formed by a locking head and an attached ladder strap. The head contains longitudinal guide channels for receiving the strap, after encirclement of items to be bundled, and an internal locking tang. The latter is deflected with respect to relatively narrow auxiliary channels on opposite sides of the guide channel. One of the auxiliary channels receives the locking tang during the bundling of the items; the other auxiliary channel contains a stop against which the locking tang becomes abutted in planar engagement by the reverse thrust of the harnessed items.

In U.S. Pat. No. 4,347,648 to Dekkers, which is incorporated herein by reference, there is disclosed a tie formed by a locking head and an attached ladder strap. The head contains a locking tang and a guide channel that receives the strap after encirclement of items to be bundled. The tang engages the rungs of the ladder strap for the adjustable retention of the items. The free end of the strap has a light-weight webbed tail that facilitates the insertion of the strap into the head. The strap is advantageously molded of a stretch reorientable material and is subsequently stretched to produce a suitable strengthening and elongation of the webbed tail.

Ties have been found to be very useful and effective in bundling objects together. In addition, some ties, particularly the tie described in U.S. Pat. No. 4,347,648 to Dekkers, have also been used as a tie to pair together articles of commerce, such as pairs of shoes. Used in this manner, the tie does not hold the pair of articles together in a bundle but rather serves to keep the two pieces of merchandise together. In this capacity, the tie has been found to be very a useful device, for example, in displaying a pair of shoes for sale.

To use a tie of the type described above to pair together a pair of shoes, the tail end of the strap is inserted through an eyelet or under the shoelace of each shoe. The tail is then inserted through the guide channel of the head so that the strap forms a closed loop. As the strap is further drawn forward through the guide channel of the head, the closed loop decreases in size. If the closed loop is too small, a prospective buyer will not be able to comfortably put on both shoes at the same time since the two shoes will be too close to each other.

SUMMARY OF THE INVENTION

It is an object of the present invention to provide a new tie of the type having a locking head and an attached ladder strap.

It is another object of the present invention to provide a tie as described above which is particularly useful in pairing two objects.

Accordingly, there is provided a tie for pairing together two objects, said tie comprising a head having an elongated channel extending therethrough, a locking tang within said head, a strap extending from said head, said strap being formed of a ladder structure having rungs which are sequentially engaged by said locking tang when said strap is inserted into and through the elongated channel, wherein insertion of said strap through the elongated channel forms a closed loop which decreases in size as the strap is inserted further through the head, and a projection formed on said strap, said projection serving as a stop to limit the minimum size of the loop.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration of an embodiment for practicing the invention. The embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate an embodiment of the invention and, together with the description, serve to explain the principles of the invention. In the drawings, wherein like reference numerals represent like parts:

FIG. 2 is a right side view of the tie shown in FIG. 1;

FIG. 3 is a perspective view, broken away in part, of the tie shown in FIG. 1, the strap being shown inserted through the head; and FIG. 4 is a perspective view of the tie shown in FIG. 1, the tie being shown pairing together two shoes.

DETAILED DESCRIPTION OF A PREFERRED EMBODIMENT

Figure 1:
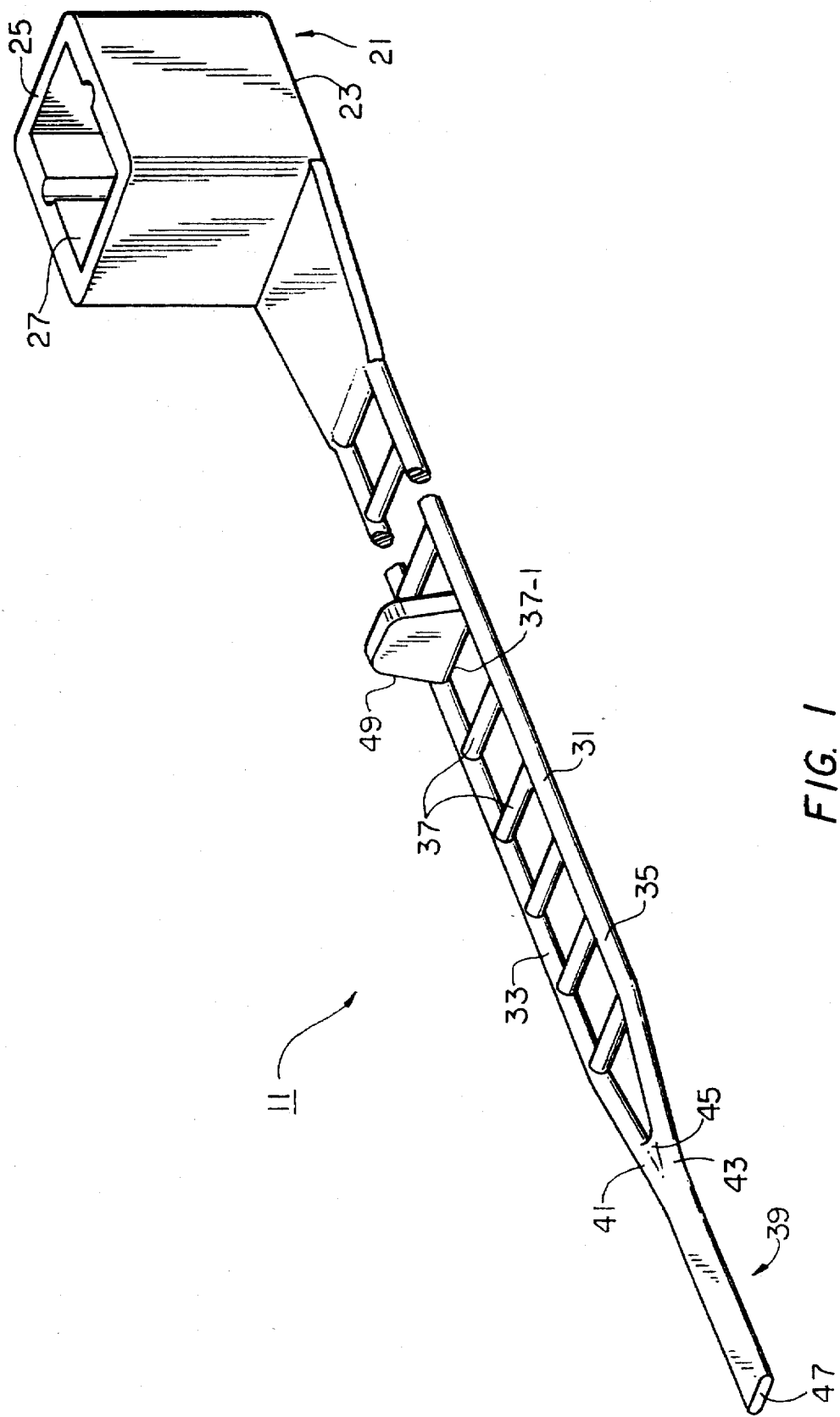
FIG. 1 is a perspective view of a tie constructed according to the teachings of the present invention for pairing together two objects.

Referring now to FIGS. 1 and 2, there are shown perspective and side views, respectively, of a tie constructed according to the teachings of the present invention for pairing together two objects, the tie being represented generally by reference numeral 11.

Tie 11 includes a head 21 and an attached strap 31.

The internal structure of head 21 is shown in FIG. 3. Head 21 is generally rectangular in shape and includes a bottom wall 23, a top wall 25, and an elongated channel 27 which extends through head 21 from bottom wall 23 to top wall 25. Head 21 further includes a locking tang 29 which may be either of the stationary type or the deflectable type.

Strap 31 is constructed in the form of a ladder structure and is approximately 30 cm in length. Strap 31 comprises a pair of side rails 33 and 35 and a plurality of rungs 37. Strap 31 further includes a elongated webbed tail 39 integrally formed at its free end. Tail 39 is formed by extensions 41 and 43 of side rails 33 and 35, respectively. Webbing 45 occupies the interval between extension side rails 41 and 43. Tail 39 tapers into a narrow tip 47 approximately 1 mm in width.

Strap 31 can be molded and then stretched. Strap 31 is preferably constructed of a molecular reorientable type material, such as nylon, polypropylene, polyester, urethane, or the like. This material, upon stretching, not only reduces the volume per unit length of the strap but also provides enhanced physical properties. For example, there is increased strength in tensile and shear strength.

The particular construction of tail 39 must be noted. Webbing 45 facilitates production of tie 11 with improved operating, molding and stretching characteristics. Because of webbing 45, the material inserted into the mold, which is advantageously accomplished by injection molding, has an enlarged channel for the flow of material, as compared with the standard ladder structure. The result is that imperfections that often attend molding, such as cold shuts, voids and nit marks are either eliminated or significantly reduced in extent.

Moreover, it must be noted that because tail 39 tapers into a narrow tip 47 of approximately 1 mm width, tail 39 can be threaded through relatively narrow openings, such as the eyelet of a shoe. This construction enables the user to pair together articles which have relatively small holes.

Referring to FIGS. 1 and 2, strap 31 further includes an upwardly extending projection 49. Projection 49 is formed on a rung 37-1 and is located at a distance "1" of approximately 26 cm from head 21. Projection 49 protrudes upward from rung 37-1 a distance "h" of approximately 1 mm. Projection 49 serves as a stop when tie 11 is used to pair together two objects as will be described in detail below.

Tie 11 may be used to pair together two objects such as shoes, sneakers, or sandals.

Referring to FIG. 4, there is shown a pair of shoes $S_1$ and $S_2$ paired together with tie 11. Tie 11 is attached to shoes $S_1$ and $S_2$ in the following manner. First, tail 39 is threaded through eyelet $E_1$ in shoe $S_1$ and then eyelet $E_2$ in shoe $S_2$. Tail 39 is then inserted into channel 27 of head 21 to form a closed loop. Tail 39 is advanced through bottom wall 23 of head 21 and out through top wall 25 in a forward direction, the forward direction being represented by arrow F in FIG. 3. Drawing strap 31 forward through head 21 decreases the size of the closed loop. Locking tang 29 is designed so as to permit strap 31 to advance forward through head 21. Locking tang 29 is also designed to engage rungs 37 when strap 31 is thrust in the reverse direction, the reverse direction being shown by arrow R in FIG. 3. Therefore, strap 31 can be advanced forward through head 21 to decrease the size of the closed loop, but strap 31 can not be thrust in the reverse direction to increase the size of the closed loop. As a result, once strap 31 is advanced through head 21 to secure shoes $S_1$ and $S_2$ together, shoes $S_1$ and $S_2$ remain paired together until cable tie 11 is severed, which precludes any further use of tie 11.

Strap 31 is capable of advancement through head 21 until projection 49 hits up against bottom wall 23 of head 21.

As can be appreciated, projection 49 limits how far strap 31 can be advanced forward through head 21, thereby limiting the minimum size of the closed loop. Due to the location of projection 49 on strap 31, namely, approximately 26 cm from head 25, shoes $S_1$ and $S_2$ can be moved relative to each other so that they are spaced apart from each other at a distance of approximately 13 cm, the approximate distance required for one to comfortably try on both shoes of a pair at the same time.

The embodiment of the present invention described above is intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A tie for pairing together two objects comprising:
    a) a head having an elongated channel extending therethrough,
    b) a locking tang within said head,
    c) a strap extending from said head, said strap being formed of a ladder structure having rungs which are sequentially engaged by said locking tang when said strap is inserted into and through the elongated channel to form a closed loop, wherein increased insertion of said strap through the elongated channel decreases the size of the closed loop, and
    d) a projection formed on said strap, said projection limiting the minimum size of the closed loop which can be formed.

2. The tie as claimed in claim 1 wherein said projection is approximately 26 cm from the head.

3. The tie as claimed in claim 2 wherein said strap is approximately 30 cm in length.

4. The tie as claimed in claim 3 wherein said projection is formed onto a rung.

5. The tie as claimed in claim 4 wherein said projection extends upward from said rung approximately 1 mm.

6. The tie as claimed in claim 5 wherein said strap includes a webbed tail portion which tapers into a narrow tip approximately 1 mm wide, thereby facilitating the insertion of said strap through relatively small openings.

7. The tie as claimed in claim 6 wherein said strap is formed by molding and stretching and is constructed of plastic.

8. A method of pairing together two objects such as shoes, comprising the steps of:
    a) providing a tie comprising a head having an elongated channel extending therethrough, a locking tang within said head, a strap extending from said head, said strap being formed of a ladder structure having rungs which are sequentially engaged by said locking tang when said strap is inserted into and through the elongated channel to form a closed loop, wherein increased insertion of said strap through the elongated channel decreases the size of the closed loop, and said strap has a projection, said projection limiting the minimum size of the closed loop which can be formed,
    b) inserting said strap through an opening in each object,
    c) inserting said strap into the channel of said head to form a closed loop, and
    d) pulling said strap through said head until said projection hits upon said head thereby limiting the minimum size of the closed loop.

9. A tie for pairing together two objects comprising:
    (a). a head having an elongated channel extending therethrough,
    (b). a locking tang within said head,
    (c). a strap extending from said head, said strap being engaged by said locking tang when said strap is inserted into and through the elongated channel to form a closed loop, wherein increased insertion of said strap through the elongated channel decreases the size of the closed loop, and
    (d). a projection formed on said strap, said projection limiting the minimum size of the closed loop which can be formed.

* * * * *